Dec. 1, 1970     R. P. SENICK ET AL     3,544,173
MOP HANDLE AND CLAMP MECHANISM
Filed March 12, 1969
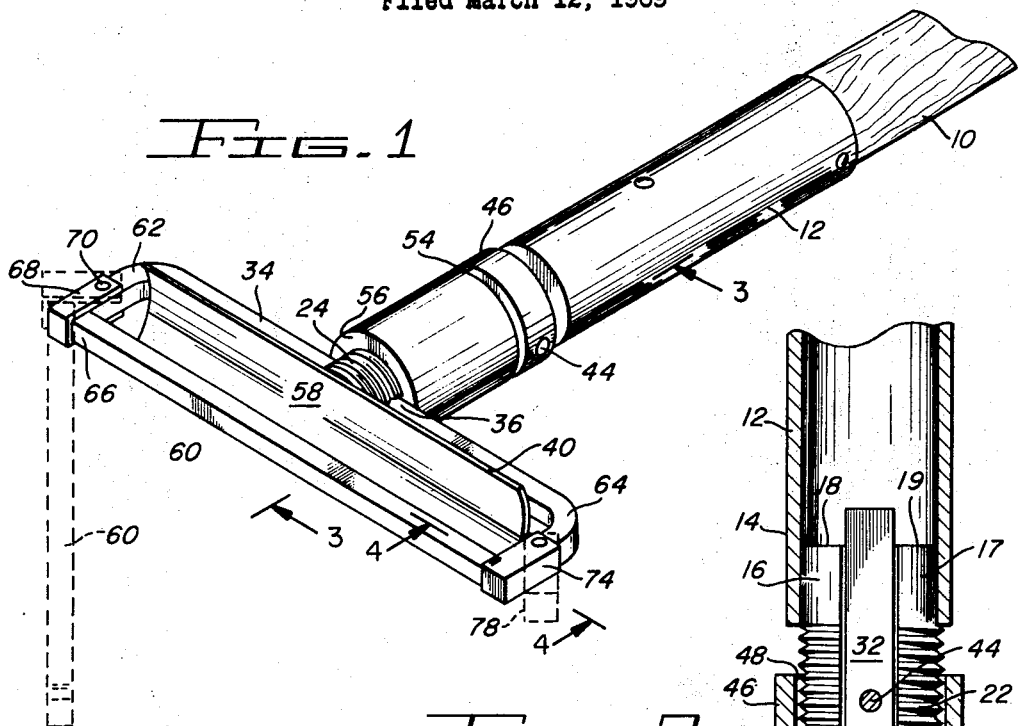
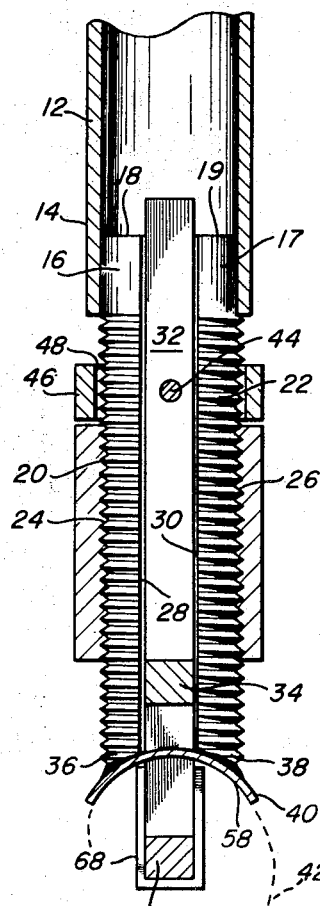
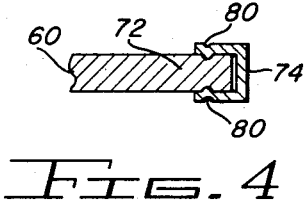
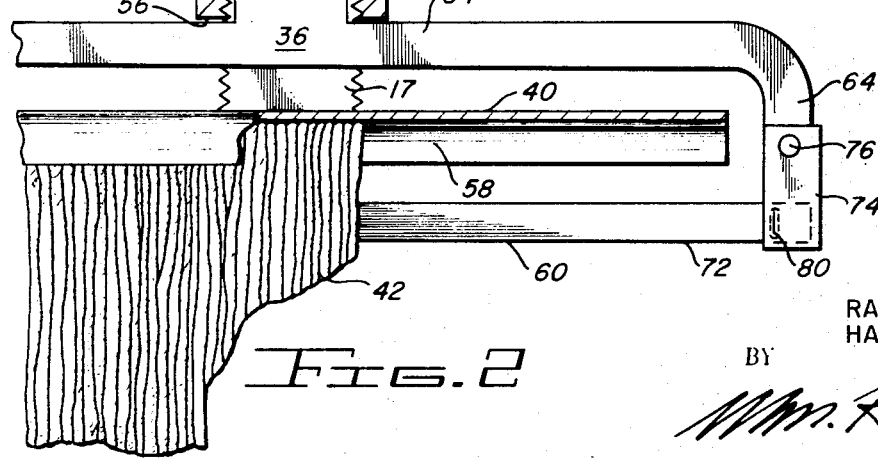
INVENTORS.
RALPH P. SENICK
HARVEY I. IIDA
BY *Wm. H. Dean*

United States Patent Office 3,544,173
Patented Dec. 1, 1970

---

3,544,173
MOP HANDLE AND CLAMP MECHANISM
Ralph P. Senick, 3055 E. Desert Cove Ave. 85029, and Harvey I. Iida, 3938 E. Cheery Lynn Road 85018, both of Phoenix, Ariz.
Filed Mar. 12, 1969, Ser. No. 806,593
Int. Cl. A01b 1/22
U.S. Cl. 306—26                    4 Claims

ABSTRACT OF THE DISCLOSURE

A mop handle and clamp mechanism having a handle structure with externally screw threaded generally semi-circular spaced apart arms having a clamp bar at the end thereof; a bail member having a shank extending between said arms and connected to a ring slidably mounted over said externally screw threaded portions; a nut member screw threadably mounted on said externally screw threaded portions of said arms and disposed between said bail member and said ring for actuating said bail member relative to said clamp member; and a pivoted bar member pivotally mounted on opposite ends of U-shaped portions of said bail member so as to permit removable disposition of a mop between said clamp member and said bar member pivoted on said bale.

BACKGROUND OF THE INVENTION

Many handle and clamp mechanisms for mops have included wire bail which are generally disposed angularly relatively to the handle structures of the mops, such that the strands of a mop become tangled around the bail, and further, many of these mechanisms have employed simple toggle clamp mechanisms which are not sufficiently strong and secured to withstand extremely rugged surface.

Many of the mop handle and clamp mechanisms have not been suitable for commercial use where continuous forceful operation of a mop is required, and many of the mop handle and clamp mechanisms have given considerable difficulty during wringing operations, and when the mop is under agitation to shake it relative to the handle, the loose strands of a mop become entangled about the bail and waste considerable time of the operator.

SUMMARY OF THE INVENTION

The present invention relates to a mop handle and clamp mechanism which comprises novel handle structure having a pair of spaced apart externally screw threaded generally semi-circular in cross-section arms to which a mop engaging member is secured, and wherein a bail member is provided with a shank extending between said arms and connected to a ring surrounding said arms and slidable over the screw threaded portions thereof, said ring being engageable by an internally screw threaded nut screw threaded on the external screw threaded portions of said arms, and disposed between said nut and said bail for actuating said bail relative to said mop engaging bar; said bail being substantially U-shaped and parallel with said first mentioned bar; and a second bar pivotally connected with opposite ends of the U-shaped bale member and in close proximity thereto, and generally parallel thereto for holding a mop between said second bar and the bar connected to said arms, whereby the overall bail structure is very compact and closely parallel to the clamp mop strands.

The invention further comprises very strong, reliable and forceful mop holding bail and bar structure which is clamped by powerful screw threaded action so that the mop is held securely in connection with the holder and the bail structure is closely parallel to the clamped mop strands so that when they are wrung or shook, that they do not become entangled around the bail structure of the invention.

Accordingly, it is an object of the invention to provide a mop handle and clamp mechanism which is very strong, reliable and convenient to operate.

Another object of the invention is to provide a mop handle and clamp mechanism having novel screw threaded mechanism operable in connection with the handle structure and the bail structure of the invention to provide powerful clamping action against mop strands;

Another object of the invention is to provide a novel mop handle and clamp mechanism having novel screw threaded means for powerfully forcing a bar mechanism in connection with mop strands and a pivoted bar mechanism for readily releasably securing said strands adjacent the clamping mechanism of the invention to permit facility in changing mops and to permit reliable holding of mop strands in connection with the invention.

Another object of the invention is to provide a very powerful and strong mop clamp mechanism which securely holds mop strands in connection with the handle structure and wherein bail structure is closely parallel to the clamping mechanism holding the mop strands to prevent the mop strands from becoming entangled around the bail structure during wringing or shaking operations of the mop strands.

Further objects and advantages of the invention may be apparent from the following specification, appended claims, and accompanying drawings:

BRIEF DESCRIPTION OF THE DRAWINGS

FIG. 1 is a perspective view of the mop handle and clamp mechanism of the invention showing the handle fragmentarily and showing by broken lines varying positions of parts of the mop release mechanism;

FIG. 2 is an enlarged fragmentary sectional view taken axially through the handle and clamp mechanism of the invention, and showing parts and portions in elevation to facilitate the illustration;

FIG. 3 is an enlarged fragmentary sectional view taken from the line 3—3 of FIG. 1, showing parts and portions in elevation to facilitate the illustration; and FIG. 4 is a fragmentary sectional view taken from the line 4—4 of FIG. 1, showing the structure on slightly enlarged scale.

DESCRIPTION OF THE PREFERRED EMBODIMENTS

As shown in FIG. 1 of the drawings, the mop handle and clamp mechanism of the invention is provided with a handle 10 which may be made of wood or other suitable material.

This handle 10 extends into a hollow cylindrical metal sleeve 12 to the normally lower end 14 of which is fixed a pair of spaced apart generally semi-circular in cross-section arms 16 and 17. These arms at their upper ends are provided with portions 18 and 19 which are fused, welded or otherwise secured in the tubular member 12.

Extending portions 20 and 22 of these arms 16 and 17 are provided with external screw threads 24 and 26, respectively. The arms are generally semi-circular in cross-section and being spaced apart so that their respective adjacent walls 28 and 30 provide a guide for a shank 32 of a bale member 34. Fixed by fusion, welding or otherwise to normally lower ends 36 and 38 of the arms 16 and 17 is a clamp or bar member 40 which is generally arcuate in cross-section and adapted to engage mop structure 42. The mop structure 42 is generally flexible stranded structure, such as shown in FIG. 2 of the drawings, but which is shown by broken lines in FIG. 3 of the drawings.

The bail 34 at its median portion 36 is connected to the shank 32 by welding or otherwise, and the shank 32, as shown in FIG. 2 of the drawings, is substantially broader than it is in the plane, shown in FIG. 3 of the drawings.

Extending through the shank 32 is a pin 44 which also extends through a ring 46 and secures the ring 46 to the shank 32. This ring 46 is provided with a smooth internal bore 48 adapted to slide axially along the arms 16 and 17 over the external screw threads 24 and 26 thereof. Thus, the ring 46 moves with the shank 32 of the bail 34, and an internally screw threaded hollow cylindrical nut 50 is provided with internal screw threads 52 screw threadably and helically operable on the external screw threads 24 and 26 of the arms 16 and 17. One end 54 of the internally screw threaded nut 50 is adjacent to the ring 46 and adapted to rotationally bear thereagainst. An opposite 56 of the nut 52 is adjacent to the median portion 36 of the bail 34 and is adapted to move the bail 34 laterally with respect to the arcuate in cross-section bar 40.

Thus, rotation of the nut 50 on the helical threads 24 and 26 which cooperate with the internal threads 52 may move the bail 34 toward the handle 10 by bearing rotationally on the ring 46 or the rotation of the hollow cylindrical nut 50 may force the bail 34 toward the bar 40 by rotational bearing on the median portion 36 of the bail 34.

It will be seen that the bar 40 is provided with a concave portion 58, as shown in FIG. 3 of the drawings, which is directed generally away from the handle 10. The bail 34 supports a hinged bar 60 against which the bar 40 may force strands of the mop 42 for clamping the same in secure position in connection with the structure of the invention.

The bail 34 is provided with opposite ends 62 and 64 which are disposed at substantially right angles to the median portion 34, and thereby forming a generally U-shaped structure, the opposite ends of which support the pivoted bar 60 in opposition to the generally concave portion 58 of the clamp bar 40.

The bar 60 at its end 66 is fixed to a generally U-shaped hinge member 68 which is pivoted by a pin 70 to the end portion 62 of the bail 34.

An opposite end portion 72 of the bar 60 is removably engaged by a latch member 74 which is hinged on a pin 76 carried in the end 64 of the bail member 34. This latch member 74 is adapted to be pivoted into a broken line position 78, as shown in FIG. 1 of the drawings, for releasing the bar 60 to a broken line position, as shown in FIG. 1 of the drawings, such that the hinge member 68 pivots about the pin 70 to allow the bar 60 to move into said broken line position.

The latch member 74 is provided with inwardly directed spring detent portions 80, as shown in FIG. 4 of the drawings, which resiliently engage corresponding recesses in the end portion 72 of the bar 60.

In operation of the present invention, the bail 34 is closely adjacent the bar or clamp member 40 and the pivoted bar 60 so that when the stranded mop is clamped between the clamp bar 40 and the pivoted bar 60, the mop may be wrung and shook without having mop strands tangled around the bail 34. Additionally, the powerful clamping means provided by the externally screw threaded portions of the arms 16 and 17 engaged helically by the screw threads 52 of the nut 50 permits the mop to be very securely clamped between the clamp bar 40 and the pivoted bar 60.

The pivoted latch 74 and the pivoted bracket 68 provide simple facility for removing and replacing the mop 42 between the clamp bar 40 and the pivoted bar 60.

It will be apparent to those skilled in the art that various modifications may be resorted to without departing from the spirit of the invention.

We claim:

1. In a mop handle and clamp mechanism, the combination of: an elongated handle structure having a bifurcated end structure; said structure having a pair of arms which are spaced apart, generally semi-circular in cross-section and externally screw threaded; a mop engaging bar secured to the distal end positions of said arms; a bail member having a shank extending between said arms; a ring-shaped member 46 slidably mounted on the externally screw threaded portions of said arms; means connecting said ring-shaped member and said shank; an internally screw threaded nut engaging the externally screw threaded portions of said arms; said nut having opposite ends disposed between and adjacent said ring-shaped member and said bail member; and a second bar member carried by said bail member in generally parallel relation to said mop engaging bar, whereby a mop may be clamped between said second bar and said mop engaging bar.

2. The invention, as defined in claim 1, wherein: said bale member is substantially U-shaped and is provided with a median portion connected to said arms at extending ends thereof, said bail member having opposite end portions extending from and away from said median portion at an angle thereto; said second bar secured to said opposite end portions of said bail member.

3. The invention, as defined in claim 2, wherein: said second bar is provided with one end pivotally connected to one of said ends of said bail member and is adapted to pivot away from said mop engaging bar; and latch means at the other of said ends of said bail member; said latch means removably holding said second bar in fixed relation to said other of said ends of said bail member.

4. The invention, as defined in claim 3, wherein: said latch member is generally loop-shaped and pivoted on said other of said ends of said bail member to swing over a respective end of said second bar member.

References Cited

UNITED STATES PATENTS

| 939,883 | 11/1909 | Wichmann et al | 15—153 |
| 2,086,422 | 7/1937 | Klimt | 306—41 |
| 2,109,335 | 2/1938 | Lawlor | 15—153 |
| 2,278,308 | 3/1942 | Fairchild | 287—104 |
| 2,334,449 | 11/1943 | Strait | 287—105 |
| 2,717,405 | 9/1955 | Zucker | 15—153 UXR |
| 2,692,403 | 10/1954 | Friar | 15—153 |

W. L. SHEDD, Assistant Examiner

DAVID J. WILLIAMOWSKY, Primary Examiner

U.S. Cl. X.R.

15—153; 287—105